United States Patent
Scholz et al.

(10) Patent No.: US 7,281,765 B2
(45) Date of Patent: Oct. 16, 2007

(54) FITTING FOR A VEHICLE SEAT

(75) Inventors: Grit Scholz, Remscheid (DE); Ulrich Lehmann, Alfter-Bonn (DE); Holger Finner, Hückeswagen (DE); Andreas Vedder, Haan (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/502,260

(22) Filed: Aug. 10, 2006

(65) Prior Publication Data

US 2006/0290187 A1    Dec. 28, 2006

Related U.S. Application Data

(63) Continuation of application No. PCT/EP2005/000677, filed on Jan. 25, 2005.

(30) Foreign Application Priority Data

Feb. 12, 2004   (DE) .................. 10 2004 007 043

(51) Int. Cl.
   *B60N 2/22* (2006.01)
(52) U.S. Cl. ...................... 297/362; 475/162
(58) Field of Classification Search ................ 297/362, 297/374; 475/162, 175, 177; 74/528
   See application file for complete search history.

(56) References Cited

U.S. PATENT DOCUMENTS

| | | | |
|---|---|---|---|
| 3,171,699 A | 3/1965 | Maxey | |
| 4,371,207 A | 2/1983 | Wilking et al. | |
| 4,439,053 A | 3/1984 | Pelz | |
| 4,582,360 A | 4/1986 | Becker | |
| 4,786,110 A | 11/1988 | Mahling et al. | |
| 5,154,475 A | 10/1992 | Kafitz | |
| 5,277,672 A | 1/1994 | Droulon et al. | |
| 5,312,158 A * | 5/1994 | Wittig et al. ................ | 297/362 |
| 5,524,970 A | 6/1996 | Kienke et al. | |
| 5,586,833 A | 12/1996 | Vossmann et al. | |
| 5,634,380 A | 6/1997 | Scholz et al. | |
| 5,634,689 A | 6/1997 | Putsch et al. | |
| 5,810,442 A | 9/1998 | Ito et al. | |
| 5,871,414 A | 2/1999 | Voss et al. | |
| 6,305,748 B1 | 10/2001 | Ohba | |
| 6,578,921 B2 * | 6/2003 | Koga et al. ................ | 297/362 |

(Continued)

FOREIGN PATENT DOCUMENTS

CA      2019952 C      12/1993

(Continued)

*Primary Examiner*—Peter R. Brown
(74) *Attorney, Agent, or Firm*—Womble Carlyle Sandridge & Rice, PLLC

(57) ABSTRACT

A fitting for a vehicle seat, in particular for a motor vehicle seat, has a first fitting part (11), a second fitting part (12) in geared connection with the first fitting part (11), and an eccentric (26, 27) for driving a rolling movement of the second fitting part (12) on the first fitting part (11). The eccentric is defined by at least one driving ring (26) and two wedge segments (27). The wedge segments (27) are braced with respect to one another. The driving ring (26) encloses the wedge segments (27). For each of the wedge segments (27), the outer side of the wedge segment bears along at least one outer supporting line (33) against the driving ring (26).

23 Claims, 3 Drawing Sheets

U.S. PATENT DOCUMENTS

| | | |
|---|---|---|
| 6,619,743 B1 | 9/2003 | Scholz et al. |
| 6,637,821 B2 | 10/2003 | Lee et al. |
| 6,918,635 B2 | 7/2005 | Finner et al. |
| 7,090,298 B2 * | 8/2006 | Lange .................. 297/362 |

FOREIGN PATENT DOCUMENTS

| | | |
|---|---|---|
| DE | 39 41 215 A1 | 6/1991 |
| DE | 40 07 023 A1 | 9/1991 |
| DE | 41 19 980 A1 | 12/1992 |
| DE | 195 17 441 C1 | 10/1996 |
| DE | 195 33 453 A1 | 3/1997 |
| DE | 195 48 809 C1 | 5/1997 |
| DE | 197 16 813 A1 | 10/1998 |
| DE | 197 24 555 C1 | 11/1998 |
| DE | 198 22 649 C1 | 11/1999 |
| DE | 199 38 666 A1 | 2/2001 |
| DE | 199 61 639 A1 | 10/2001 |
| DE | 101 44 840 A1 | 3/2003 |
| EP | 0 432 420 A2 | 6/1991 |
| FR | 2 656 392 A2 | 6/1991 |
| FR | 2 806 980 A1 | 10/2001 |
| GB | 2 107 386 A | 4/1983 |
| GB | 2 257 031 A | 1/1993 |
| WO | WO 2005/077704 A2 | 8/2005 |

* cited by examiner

FITTING FOR A VEHICLE SEAT

CROSS-REFERENCE TO RELATED APPLICATION

The present application is a continuation of International Application PCT/EP2005/000677, which was filed Jan. 25, 2005. The entire disclosure of PCT/EP2005/000677 is incorporated herein by reference.

BACKGROUND OF THE INVENTION

The present invention relates to a fitting for a vehicle seat, in particular for a motor vehicle seat, with a first fitting part, a second fitting part in geared connection with the first fitting part, and an eccentric for driving a rolling movement of the second fitting part on the first fitting part, with the eccentric being defined by at least one driving ring and two wedge segments, and the two wedge segments being braced with respect to one another.

DE 199 38 666 A1 discloses a fitting of the type described immediately above, in which the eccentric required for the drive is defined essentially by the driving ring, which is arranged radially on the inside, and the two wedge segments arranged radially outside the driving ring. The driving ring and a driving bushing for driving the eccentric are connected to each other in a rotationally fixed manner by means of a cut-out and two lugs. The wedge segments bear against a sliding bearing bushing that is arranged on the second fitting part and positioned radially outwardly of the wedge segments. The wedge segments slide along the sliding bearing bushing with little friction during the rolling movement. A fitting of similar design is described in DE 101 44 840 A1, with the driving ring and the driving bushing therein being connected to each other in a rotationally fixed manner by means of a transmission profile.

BRIEF SUMMARY OF SOME ASPECTS OF THE INVENTION

The present invention is based on the object of providing an alternative construction to a fitting of the type mentioned above. In accordance with one aspect of the present invention, a fitting for a vehicle seat, in particular for a motor vehicle seat, includes a first fitting part, a second fitting part in geared connection with the first fitting part, and an eccentric for driving a rolling movement of the second fitting part on the first fitting part. The eccentric includes at least one driving ring and two wedge segments. The driving ring encloses the wedge segments, and the wedge segments are braced with respect to one another. For each of the wedge segments, an outer side of the wedge segment bears along at least one outer supporting line against the driving ring.

Because the driving ring surrounds the wedge segments, i.e. the driving ring is arranged radially outside the wedge segments, advantages can be afforded for the ratios of forces, with a defined contact being produced by the wedge segments bearing in each case on their outer side along at least one outer supporting line against the driving ring so that the directions of force and angular ratios can be optimized with regard to the geared engagement and self-locking. In this case, the supporting line, which is formed in a positionally fixed manner on the wedge segments or the driving ring, ensures line contact which is independent of external forces, and is used for the play-free position. Instead of a single driving ring, it is also possible, for example, to provide two axially offset driving rings.

Each of the two wedge segments preferably bears with its outer side along an outer supporting line against the driving ring. Each of the two wedge segments is preferably mounted with its inner side on the first fitting part. Preferably each of the wedge segments bears by means of a pair of inner supporting lines on a collar formation of the first fitting part. The collar formation results in a defined alignment of the wedge segments relative to the first fitting part. One supporting line in each case of the pair is preferably arranged in front of and behind the individual supporting line in the circumferential direction of the collar formation.

The driving ring is preferably rotatably mounted by means of a sliding bearing (with little friction). In particular, the driving ring is mounted in a sliding bearing bushing, thus producing a smooth-running rolling movement of the two fitting parts. An elastic element between the sliding bearing and second fitting part can reduce torque peaks, which occur when passing through narrow points when actuated without load, so that the peak loading of the individual components is reduced and, therefore, the service life before wear occurs is extended.

The friction between the driving ring and the fitting part adjacent to it, i.e. in particular between the driving ring and the sliding bearing bushing assigned to the second fitting part, is preferably less than the other frictional pairings which occur, for example between the driving ring and the wedge segments and between the wedge segments and the fitting part adjacent to them, i.e. in particular between the wedge segments and the collar formation assigned to the first fitting part. In this case, the wedge segments are preferably mounted on both sides, i.e. on the inner side and outer side, by means of a material pairing "steel on steel" (greased).

A driving bushing is provided for driving the eccentric. The driving ring can be formed integrally with, or separately from, the driving bushing. When the driving ring is formed separately from the driving bushing, the driving ring and the driving bushing interact with one another in a rotationally fixed manner (i.e., they rotate together). The separate formation can simplify the installation and make possible a different selection of material. On account of the frictional requirements and the carrying along of the wedge segments, the driving ring is preferably formed from steel or from another, preferably sintered, metallic material. With regard to simplifying the installation, it suffices if the driving ring is only provided over the circumference of the wedge segments, i.e. is not completely closed, as long as the rotationally fixed interaction with the driving bushing is ensured.

The rotationally fixed interaction of the driving bushing and driving ring by means of a transmission profile has the advantage that higher loads can be transmitted via this connection. This improves the possibility of using the fitting as a motor-adjustable fitting and reduces the peak loading of the individual components. Generally, with two fittings according to the invention and a common drive shaft, a reliable synchronization is possible in the fitting of the drive shaft.

The fitting according to the invention is preferably configured for a motor drive, but it can also be driven manually. The invention can also be used in other motor driven or manually driven geared fittings, irrespective of whether an eccentric comprising wedges or a fixed eccentric is provided.

Other aspects and advantages of the present invention will become apparent from the following.

BRIEF DESCRIPTION OF THE DRAWINGS

The present invention is explained in more detail below with reference to an exemplary embodiment which is illustrated in the drawings, in which.

DETAILED DESCRIPTION OF EXEMPLARY EMBODIMENT

Figure 2:
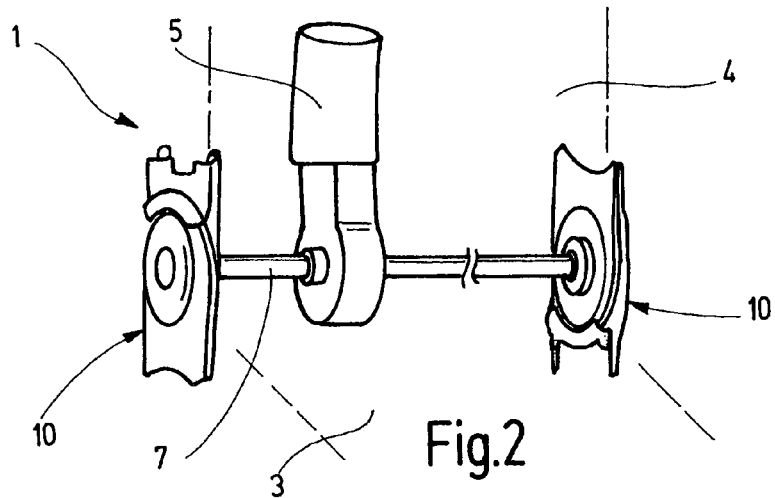
FIG. 2 shows a diagrammatic illustration of a vehicle seat with two fittings according to the invention.
Figure 3:
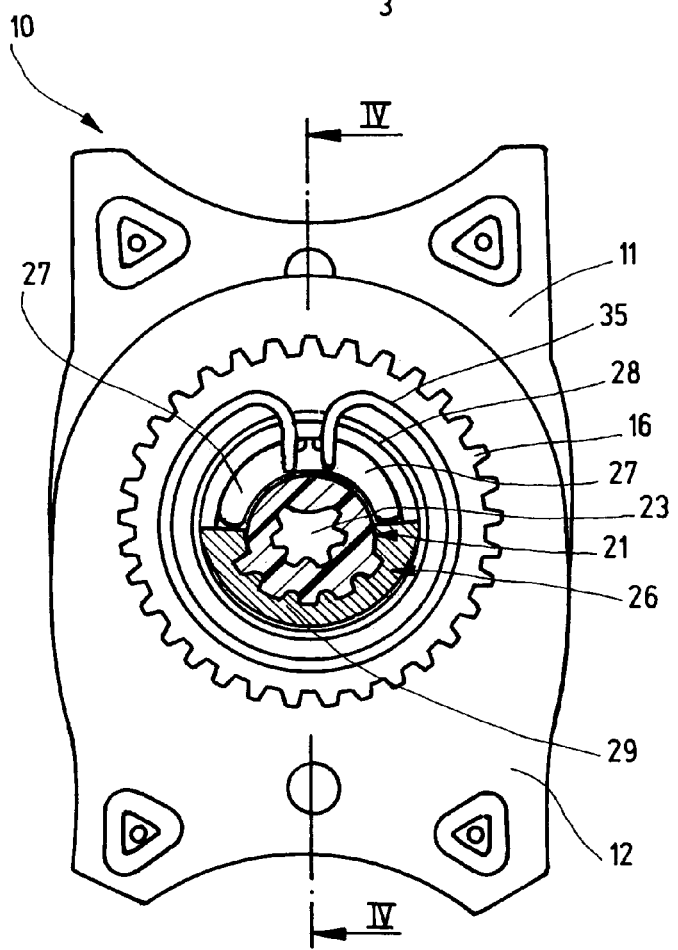
FIG. 3 shows a radial section through the exemplary embodiment along the line III-III in FIG. 4.
Figure 4:
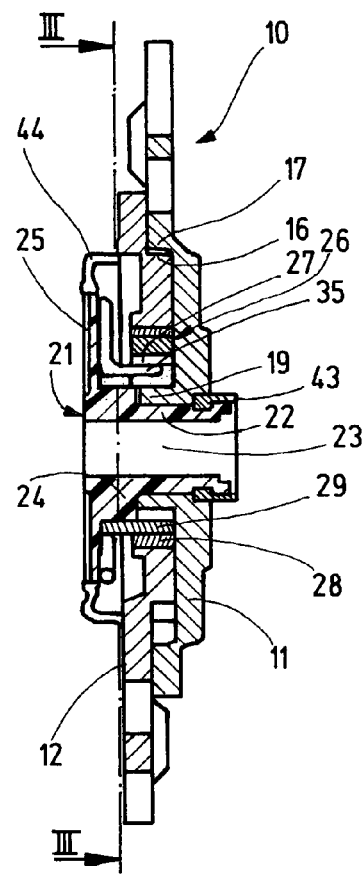
FIG. 4 shows an axial section through the exemplary embodiment along the line IV-IV in FIG. 3.

A vehicle seat 1, which is schematically illustrated by dashed lines in FIG. 2, for a motor vehicle has a seat part 3 and a backrest 4 which can be adjusted in its inclination relative to the seat part 3 by motor. An electric motor 5 which is fitted to the structure of the backrest 4 is provided as the drive for the adjustment of the inclination. The electric motor 5 rotates a drive shaft 7 which is arranged horizontally in the transition region between seat part 3 and backrest 4. On both sides of the vehicle seat 1, the drive shaft 7 engages in a rotationally fixed manner in a fitting 10 in a way described later.

The fitting 10 is designed as a geared fitting, in which a first fitting part 111 and a second fitting part 12 are connected to each other via an adjustment and fixing gear. The two fitting parts 11 and 12 have an essentially flat shape and are composed of steel. The first fitting part 11 is connected fixedly to the structure (in the present case the structure of the backrest 4) supporting the driving electric motor 5. Therefore, in the exemplary embodiment, the first fitting part 11 is illustrated fixed to the backrest and therefore at the top in the drawing. Correspondingly, in the exemplary embodiment the second fitting part 12 is illustrated fixed to the seat part and at the bottom in the drawing. In the case of a different arrangement of the electric motor and in the case of manually driven fittings, the positions of the fitting parts 11 and 12 can be interchanged.

To form the gear, a toothed wheel 16 with an external toothing is impressed on the second fitting part 12, and a toothed ring 17 with an internal toothing is impressed on the first fitting part 11, with the toothed wheel and toothed ring meshing with each other. The diameter of the addendum circle of the external toothing of the toothed wheel 16 is smaller by at least one tooth height than the diameter of the dedendum circle of the internal toothing of the toothed ring 17. The corresponding difference in the number of teeth of toothed wheel 16 and toothed ring 17 permits a rolling movement of the toothed ring 17 on the toothed wheel 16.

On the side facing the toothed wheel 16, the first fitting part 111 has an integrally formed collar formation 19 that is arranged concentrically to the internal toothing of the toothed ring 17. A driving bushing 21 is mounted with play in the collar formation 19 by means of a hub 22. The driving bushing 21, which is composed of plastic or steel, is provided centrally with a hole 23 matching an external splined profile of the drive shaft 7. Following its hub 22, the driving bushing 21 has a step 24 of larger diameter than the hub 22 and, adjoining it, a covering disk 25 of larger diameter than the step 24.

Over part of its circumference, the step 24 has a radially outwardly directed external toothing 24' in the region of which it accommodates a driving ring 26 of steel. In some regions, driving ring 26 has an internal toothing 26'. The internal toothing 26' engages entirely and in a form-fitting manner in the external toothing 24', as a result of which a transmission profile is defined. Instead of the toothings, other form-fitting transmission profiles with ribs, polygonal formations or the like are also possible. To eliminate play in the form-fitting connection between internal toothing 26' and external toothing 24', during installation the form-fitting connection can take place with the material of the step 24 being displaced.

In a manner described more precisely below, the driving ring 26 encloses two wedge segments 27. The wedge segments 27 are arranged radially within the driving ring 26, are made from steel and, in a manner likewise described in more detail below, are mounted on the outside of the collar formation 19. The outside of the driving ring 26 in turn supports a sliding bearing bushing 28 which is pressed in a rotationally fixed manner into the second fitting part 12 directly or with the interposition of an elastic element. Furthermore, the driving ring 26 has an axially projecting driving segment 29 which is mounted with play between the narrow sides of the wedge segments 27 and bears the internal toothing 26' on its radially inwardly pointing side. The driving segment 29, the step 24 of the driving bushing 21 and a section of the hole 23 together with the drive shaft 7 are therefore situated in one plane, which avoids multi-axial stress states. Two protruding pins 32 or, in general, cams are integrally formed on the inside of the covering disk 25 of the driving bushing 21. The ends of the pins 32 bear in each case against one of the two wedge segments 27 and secure it in the axial direction.

Figure 5:
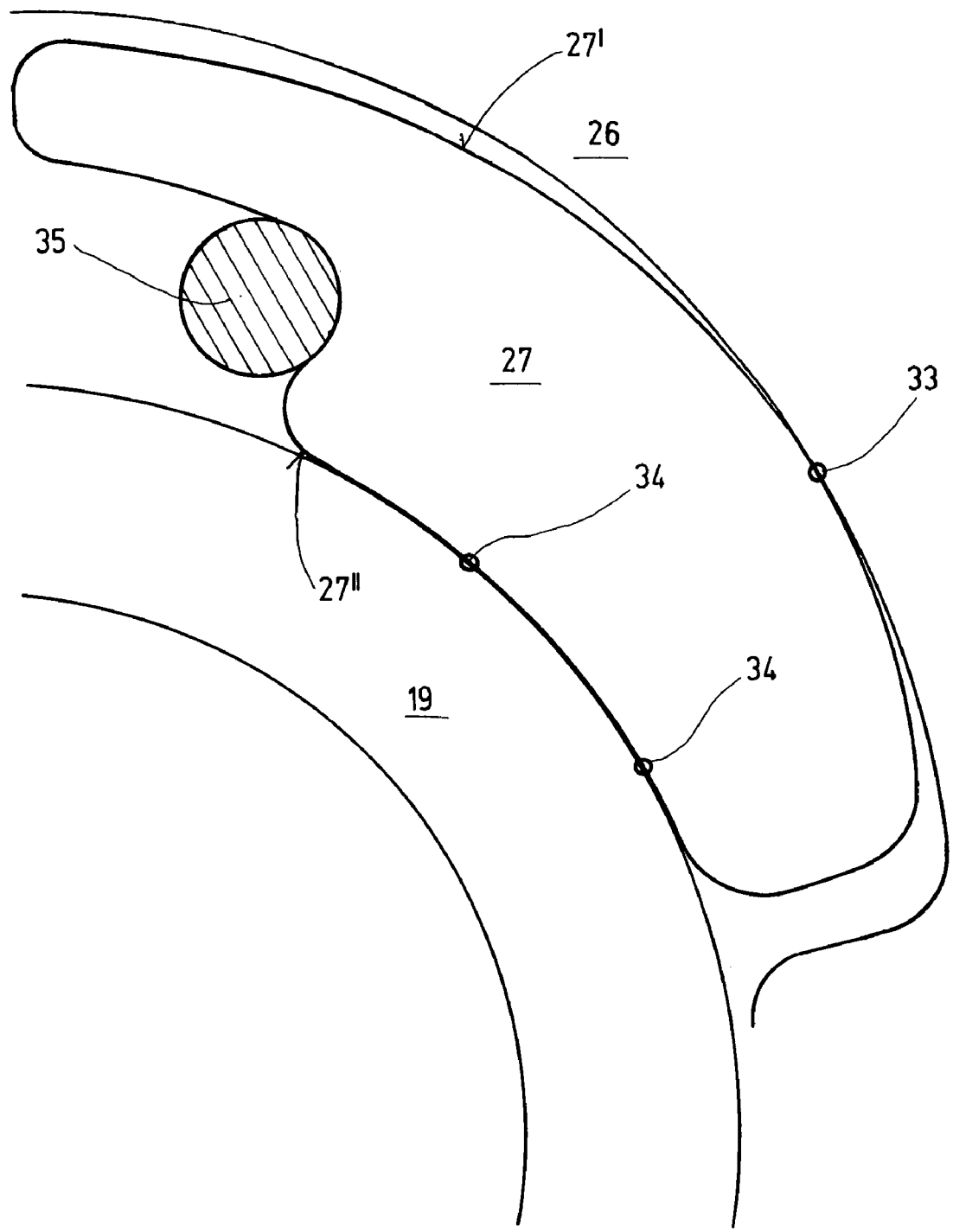
FIG. 5 shows an enlarged view of a wedge segment with parts of the collar formation and of the driving ring.

The convex outer sides 27' and concave inner sides 27" of the wedge segments 27 have a geometry which deviates from the shape of an arc of a circle or cylinder. As a result, the wedge segments 27 do not bear with their outer sides 27' in a planar manner against the inner surface of the driving ring 26, and they do not bear with their inner sides 27" in a planar manner against the collar formation 19. Rather, on the outer side 27', the wedge segments only bear against (e.g., along) at least one outer supporting line 33 or, on the inner side 27", only bear against (e.g., along) at least one, in the present case two, inner supporting lines 34. These supporting lines 33 and 34 are designed as positionally fixed geometrical cambers, for example in a type of flat wave shape, and ensure a line contact, which is independent of the external forces, of the wedge segments 27 on the collar formation 19 or driving ring 26. The bearing by means of supporting lines 33 and 34 serves for the play-free position and the intended control of the directions of force and angle ratios in the bearing. There is therefore the possibility of setting the wedge angle effective for the control behavior of the wedge segments 27 in combination with the existing frictional value pairings in a specific manner, so that the toothed engagement between toothed wheel 16 and toothed ring 17 and the self-locking of the fitting 10 can be optimized. Reference is made expressly in this respect to DE 199 38 666 A1 (which corresponds to U.S. Pat. No. 6,619, 743), the entire disclosure content of which is fully incorporated herein by reference. In FIG. 5, the supporting lines 33 and 34 run perpendicularly with respect to the plane of projection, i.e. in the axial direction. Viewed in the circumferential direction, in the present case there is one inner supporting line 34 in each case in front of and behind the outer supporting line 33. The two inner supporting lines 34 serve, apart from the play-free position, also to increase the strength.

The mutually facing wide sides of the wedge segments 27 receive, by means of a respective recess defined by projecting portions of material, a respective angled end finger of an annular spring 35 which presses the wedge segments 27 apart in the circumferential direction, with, in the case of a blockage of the wedge segments 27 during operation or the backrest 4 starting to move against a load, the radially outer, projecting portions of material being able to touch and act upon each other.

Figure 1:
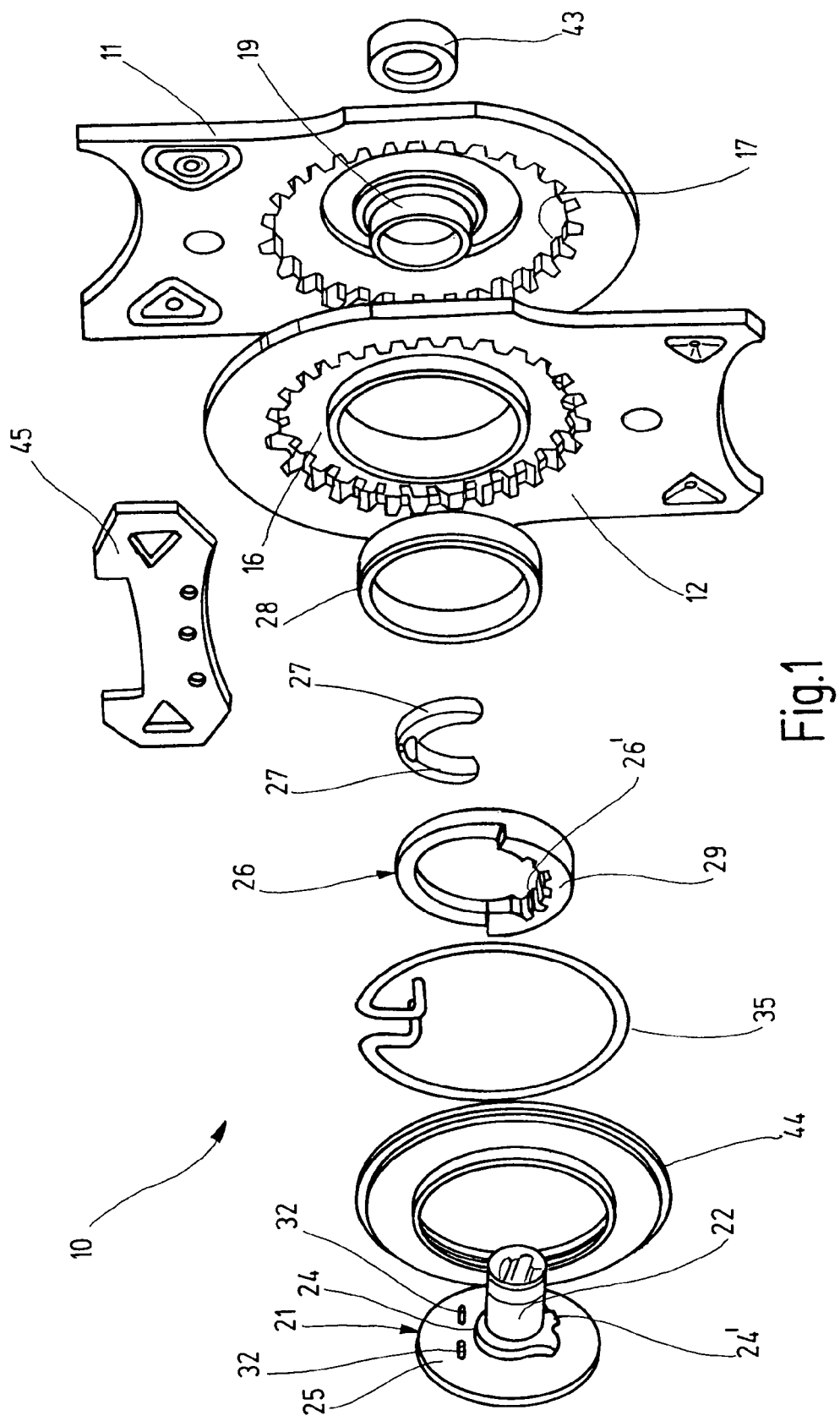
FIG. 1 shows an exploded illustration of the exemplary embodiment, with the driving bushing being illustrated from a different viewing direction.

The driving bushing 21 is secured axially on the outside of the first fitting part 11 by a retaining ring 43 which is clipped on. On the outside of the second fitting part 12, between the impression for the toothed wheel 16 and the covering disk 25 of the driving bushing 21, a sealing ring 44 is provided. To absorb the axially acting forces, a respective retaining plate 45 is welded to the two fitting parts 11 and 12, with the retaining plate engaging over the other fitting part in each case without obstructing the adjustment movement. For the sake of simplicity, only one of these retaining plates 45 is illustrated in FIG. 1.

The driving ring 26 and the wedge segments 27 define an eccentric which, in an extension of the eccentricity direction, presses the toothed wheel 16 into the toothed ring 17 at an engagement point defined in this manner. In the case of a drive by means of the rotating drive shaft 7, a torque is first of all transmitted to the driving bushing 21 and then to the eccentric, resulting in the eccentric sliding along the sliding bearing bushing 28 with the eccentricity direction being displaced and, therefore, with the engagement point of the toothed wheel 16 in the toothed ring 17 being displaced, which is illustrated as a wobbling rolling movement. The sliding bearing bushing 28 defines an outer sliding surface for the eccentric while the collar formation 19 defines an inner sliding surface for the eccentric, with the eccentric sliding along the sliding surfaces during the rolling movement. The friction between the sliding bearing bushing 28 and the driving ring 26 is preferably significantly lower than that between the wedge segments 27 and the collar formation 19 (steel on steel, greased) and than that between the driving ring 26 and the wedge segments 27 (steel on steel, greased), for example is in each case only approximately one fifth. With these friction ratios, the control behavior of the wedge segments 27 is influenced so that the wedge segments 27, for example when the drive starts up, can retain their relative alignment with respect to the other components of the eccentric.

In a modified embodiment, the outer supporting lines 33 are formed on the driving ring 26 instead of on the wedge segments 27. Additionally or alternatively, the inner supporting lines 34 may be formed on the collar formation 19 instead of on the wedge segments 27.

It will be understood by those skilled in the art that while the present invention has been discussed above with reference to an exemplary embodiment, various additions, modifications and changes can be made thereto without departing from the spirit and scope of the invention as set forth in the following claims.

What is claimed is:

1. A fitting for a vehicle seat, the fitting comprising:
    a first fitting part;
    a second fitting part in geared connection with the first fitting part; and
    an eccentric for driving a rolling movement of the second fitting part on the first fitting part, wherein
    the eccentric includes at least one driving ring and two wedge segments,
    the wedge segments are held against the driving ring,
    the driving ring encloses the wedge segments so that the wedge segments are positioned radially inwardly of at least a portion of the driving ring and the portion of the driving ring is positioned radially outwardly of the wedge segments, and
    for each of the wedge segments,
        (a) the wedge segment includes opposite inner and outer sides,
        (b) the outer side of the wedge segment bears along at least one outer supporting line of contact against the driving ring, and
        (c) there is no contact between the driving ring and any portion of the outer side of the wedge segment that is immediately laterally adjacent to the outer supporting line of contact.

2. The fitting as claimed in claim 1, wherein the wedge segments are mounted so that for each of the wedge segments, the inner side of the wedge segment is on the first fitting part.

3. The fitting as claimed in claim 2, wherein a collar formation of the first fitting part is positioned radially inwardly of the wedge segments, and for each of the wedge segments;
    the inner side of the wedge segment bears along at least one inner supporting line of contact against the collar formation of the first fitting part, and
    there is no contact between the collar formation and any portion of the inner side of the wedge segment that is immediately laterally adjacent to the inner supporting line of contact.

4. The fitting as claimed in claim 3, wherein for each of the wedge segments:
    the inner supporting line of contact is a first inner supporting line of contact;
    the inner side of the wedge segment bears along a second inner supporting line of contact against the collar formation of the first fitting part;
    there is no contact between the collar formation and any portion of the inner side of the wedge segment that is immediately laterally adjacent to the second inner supporting line of contact; and
    in a circumferential direction of the collar formation
        (a) the first inner supporting line of contact is arranged in front of the outer supporting line of contact, and
        (b) the second inner supporting line of contact is arranged behind the outer supporting line of contact.

5. The fitting as claimed in claim 3, wherein while the eccentric is driving the rolling movement of the second fitting part on the first fitting part:
    friction between the second fitting part and the driving ring is smaller than friction between the wedge segments and the first fitting part, and
    the friction between the second fitting part and the driving ring is smaller than friction between the driving ring and the wedge segments.

6. The fitting as claimed in claim 4, wherein while the eccentric is driving the rolling movement of the second fitting part on the first fitting part:
    friction between the second fitting part and the driving ring is smaller than friction between the wedge segments and the first fitting part, and
    the friction between the second fitting part and the driving ring is smaller than friction between the driving ring and the wedge segments.

7. The fitting as claimed in one claim 2, further comprising a sliding bearing, wherein the driving ring is rotatably mounted in the sliding bearing.

8. The fitting as claimed in claim 7, wherein:
    the sliding bearing comprises a sliding bearing bushing, and
    the sliding bearing bushing is mounted to the second fitting part.

9. The fitting as claimed in claim 2, further comprising a rotatably mounted, drivable driving bushing for driving the eccentric.

10. The fitting as claimed in claim 2, further comprising:
a rotatably mounted, drivable driving bushing for driving the eccentric, wherein
  (a) the driving bushing and the driving ring are formed separately,
  (b) the driving ring is mounted for rotating with the driving bushing, and
  (c) the driving bushing is configured for receiving and rotating with a drive shaft; and
a sliding bearing bushing, wherein
  (a) the sliding bearing bushing is mounted to the second fitting part, and
  (b) the driving ring is rotatably mounted in the sliding bearing bushing; wherein for each of the wedge segments
  (a) the inner side of the wedge segment bears along inner supporting lines of contact against a collar formation of the first fitting part,
  (b) in a circumferential direction of the collar formation
    (1) a first of the inner supporting lines of contact is arranged in front of the outer supporting line, and
    (2) a second of the inner supporting lines of contact is arranged behind the outer supporting line,
  (c) a portion of the inner side of the wedge segment is positioned between the first and second inner supporting lines of contact in the circumferential direction, and
  (d) the portion of the inner side of the wedge segment, which is positioned between the first and second inner supporting lines of contact, is not in contact with the collar formation of the first fitting part.

11. The fitting as claimed in claim 1, further comprising a sliding bearing, wherein the driving ring is rotatably mounted in the sliding bearing.

12. The fitting as claimed in claim 11, wherein:
the sliding bearing comprises a sliding bearing bushing, and
the sliding bearing bushing is mounted to the second fitting part.

13. The fitting as claimed in claim 1, further comprising a rotatably mounted, drivable driving bushing for driving the eccentric.

14. The fitting as claimed in claim 13, wherein:
the driving bushing and the driving ring are formed separately, and
the driving ring is mounted for rotating with the driving bushing.

15. The fitting as claimed in claim 14, wherein the driving ring is formed from steel.

16. The fitting as claimed in claim 13, wherein the driving bushing is configured for receiving and rotating with a motor-driven drive shaft.

17. The fitting as claimed in claim 13, further comprising a drive shaft, wherein the shaft is positioned in an opening of the driving bushing in a manner so that the driving bushing rotates with the shaft.

18. The fitting as claimed in claim 17, wherein:
the driving bushing and the driving ring are formed separately, and
the driving ring is mounted for rotating with the driving bushing.

19. The fitting as claimed in claim 1 in combination with at least the vehicle seat, wherein:
the vehicle seat includes a seat part and a backrest, and
at least the fitting is positioned between the seat part and the backrest for adjusting inclination of the backrest relative to the seat part.

20. The fitting as claimed in claim 1, wherein the wedge segments being held against the driving ring comprises: the wedge segments being pressed apart from one another by a spring.

21. The fitting as claimed in claim 1, wherein the driving ring extends around the wedge segments.

22. A fitting for a vehicle seat, the fitting comprising:
a first fitting part;
a second fitting part in geared connection with the first fitting part;
an eccentric for driving a rolling movement of the second fitting part on the first fitting part; and
a drivable driving bushing for being rotated to drive the eccentric, wherein
the driving bushing is mounted for being rotated about an axis that extends in an axial direction,
the eccentric includes at least one driving ring and two wedge segments,
the wedge segments are urged away from one another by a spring so that the wedge segments are held against the driving ring,
the driving ring extends around the wedge segments so that the wedge segments are positioned radially inwardly of at least a portion of the driving ring and the portion of the driving ring is positioned radially outwardly of the wedge segments, and
for each of the wedge segments,
  (a) the wedge segment includes opposite inner and outer sides,
  (b) the outer side of the wedge segment bears along at least one outer supporting line of contact against the driving ring, and
  (c) there is no contact between the driving ring and any portion of the outer side of the wedge segment that is immediately laterally adjacent to the outer supporting line of contact, and
  (d) the outer supporting line of contact extends in the axial direction.

23. The fitting as claimed in claim 22, wherein
a collar formation of the first fitting part is positioned radially inwardly of the wedge segments; and
for each of the wedge segments,
  (a) the inner side of the wedge segment bears along a first inner supporting line of contact against the collar formation of the first fitting part, with the first inner supporting line of contact extending in the axial direction,
  (b) there is no contact between the collar formation and any portion of the inner side of the wedge segment that is immediately laterally adjacent to the first inner supporting line of contact,
  (c) the inner side of the wedge segment bears along a second inner supporting line of contact against the collar formation of the first fitting part, with the second inner supporting line of contact extending in the axial direction,
  (d) there is no contact between the collar formation and any portion of the inner side of the wedge segment that is immediately laterally adjacent to the second inner supporting line of contact, whereby the first and second inner supporting lines of contact are spaced apart from one another in a circumferential direction,
  (e) the first inner supporting line of contact is arranged forwardly of the outer supporting line of contact in the circumferential direction, and
  (f) the second inner supporting line of contact is arranged rearwardly of the outer supporting line of contact in the circumferential direction.

* * * * *